United States Patent [19]
Landais

[11] Patent Number: 4,859,818
[45] Date of Patent: Aug. 22, 1989

[54] ELECTRIC INERTIA-ACTUATED CIRCUIT BREAKER

[75] Inventor: Jean Landais, Jouy-le-Moutier, France

[73] Assignees: Automobiles Peugeot, Paris; Automobiles Citroen, Neuilly/Seine, both of France

[21] Appl. No.: 245,645

[22] Filed: Sep. 16, 1988

[30] Foreign Application Priority Data
Sep. 21, 1987 [FR] France .................. 87 13043

[51] Int. Cl.⁴ ........................................... H01H 35/14
[52] U.S. Cl. ............................. 200/61.45 R; 200/61.5
[58] Field of Search ............... 200/61.45 R, 61.45 M, 200/61.5, 61.53

[56] References Cited

U.S. PATENT DOCUMENTS

| | | | |
|---|---|---|---|
| 2,291,236 | 7/1942 | Kilgour | 200/61.5 X |
| 2,778,896 | 1/1957 | Tollefsen | 200/61.5 |
| 3,406,774 | 10/1968 | Lacey | 180/96 |
| 3,500,007 | 3/1970 | Koomen et al. | 200/61.45 R |
| 3,798,399 | 3/1974 | Corporandy | 200/61.5 X |

FOREIGN PATENT DOCUMENTS

| | | |
|---|---|---|
| 961138 | 1/1975 | Canada . |
| 3128594 | 2/1983 | Fed. Rep. of Germany . |
| 2151585 | 4/1973 | France . |
| 2191498 | 2/1974 | France . |
| 506876 | 6/1971 | Morocco . |

Primary Examiner—J. R. Scott
Attorney, Agent, or Firm—Burns, Doane, Swecker & Mathis

[57] ABSTRACT

An inertia-actuated circuit breaker for protecting an electrical circuit of a motor vehicle in the event of collision or overturning of the vehicle, the circuit breaker including a piston with a conductive element. The piston is axially slidable inside a case between a rest position and a circuit-breaking position. In the rest position, the conductive element bears against two contact studs of the electrical circuit. A ball is resiliently maintained in a rest position between a seat of the piston and a seat of the case by a spring. The studs of the electrical circuit are mounted to be axially slidable relative to the case to permit the piston to slide axially in opposition to the resiliently yieldable force exerted by the spring and are resiliently yieldably biased against the conductive element.

7 Claims, 2 Drawing Sheets

4,859,818

ELECTRIC INERTIA-ACTUATED CIRCUIT BREAKER

BACKGROUND OF THE INVENTION

The present invention relates to an electric inertia-actuated circuit breaker.

It concerns particularly a circuit breaker employed in a motor vehicle for breaking at least one electric circuit in the event of impact and/or overturning of the vehicle.

Documents FR-A-No. 2 151 585 and FR-A-No. 2 191 241 disclose and illustrate an inertia-actuated circuit breaker of the type comprising a piston to which is fixed an electrically conductive element and which is axially slidable inside a case between a position of rest in which the conductive element bears against two contact studs of an electric circuit which it interconnects, and a circuit-breaking position in which the electric circuit is broken, and a ball which, in the position of rest, is maintained resiliently gripped by a calibration spring acting on the piston, between a fixed concave seat of the case and a concave seat of the piston, the ball being maintained in position subtantially in the centre of a chamber of the case into which it is capable of escaping radially to permit the piston to occupy the circuit-breaking position thereof.

According to these documents, the circuit breaker is arranged to be disposed inside the motor vehicle so that the general axis of the case is vertical and the ball, in the event of collision, leaves its two concave seats under the effect of the lateral acceleration it undergoes.

This type of circuit breaker has several drawbacks. In the event of overturning of the vehicle, the circuit breaker is ineffective since the piston is unable to slide axially relative to the case in opposition to the resiliently yieldable force exerted by the calibration spring, the conductive element bearing against the two fixed contact studs of the electric circuit. Furthermore, when the various component parts of the circuit breaker are assembled, it is not possible to guarantee that the conductive element is, in its position of rest, in bearing relation to the two contact studs, in particular in the case where the resiliently yieldable force exerted by the calibration spring on the piston is excessive.

SUMMARY OF THE INVENTION

In order to overcome these drawbacks, the invention provides an inertia-actuated circuit breaker of the aforementioned type, wherein each of the contact studs is axially slidably mounted relative to the case to enable the piston to slide axially in opposition to the resiliently yieldable force exerted by the calibration spring, and is resiliently yieldably biased against the conductive element.

Owing to these features, an inertia-actuated circuit breaker according to the invention permits, when it is disposed in a motor vehicle in such manner that the axis of the case extends in a direction parallel to the principal direction of travel of the vehicle, breaking the electric circuit in the event of a lateral collision or an overturning of the vehicle and in the case for example of an impact on the front end of the vehicle.

The invention also provides an arrangement in which a motor vehicle is equipped with two inertia-actuated circuit breakers according to the invention which are arranged to be parallel to the principal direction of travel of the vehicle and in opposite directions, and are connected to the electric circuit of the vehicle which is desired to be broken.

According to another feature of the invention, each of the two inertia-actuated switches is respectively located in the vicinity of one of the two upper lateral edges of the body of the vehicle.

With this arrangement, the electric circuit of the vehicle is broken whatever be the direction of the impact resulting from a collision or in the case of an overturning of the vehicle.

According to a preferred embodiment of the inertia-actuated circuit breaker of the invention, each of the contact studs is slidably mounted in a blind bore of the case in which a compression spring is disposed.

In order to limit the axial size of the circuit breaker, the fixed seat is formed on a side of a radial inner wall of the case, the contact studs being arranged on the other side of this wall and the piston having at least one axial extension which extends through the wall and on the end of which the conductive element is fixed.

According to other features of the invention, the circuit breaker has a second pair of contact studs of another electric circuit arranged in confronting relation to the two contact studs of the first-mentioned electric circuit and against which the conductive element bears when the piston occupies its circuit-breaking position. Each of the contact studs of the second pair of studs may be slidably mounted in a blind bore of the case in which a compression spring is disposed.

BRIEF DESCRIPTION OF THE DRAWINGS

Other features and advantages of the invention will be apparent from the following detailed description with reference to the accompanying drawings, in which.

DETAILED DESCRIPTION OF THE INVENTION

Figure 1:
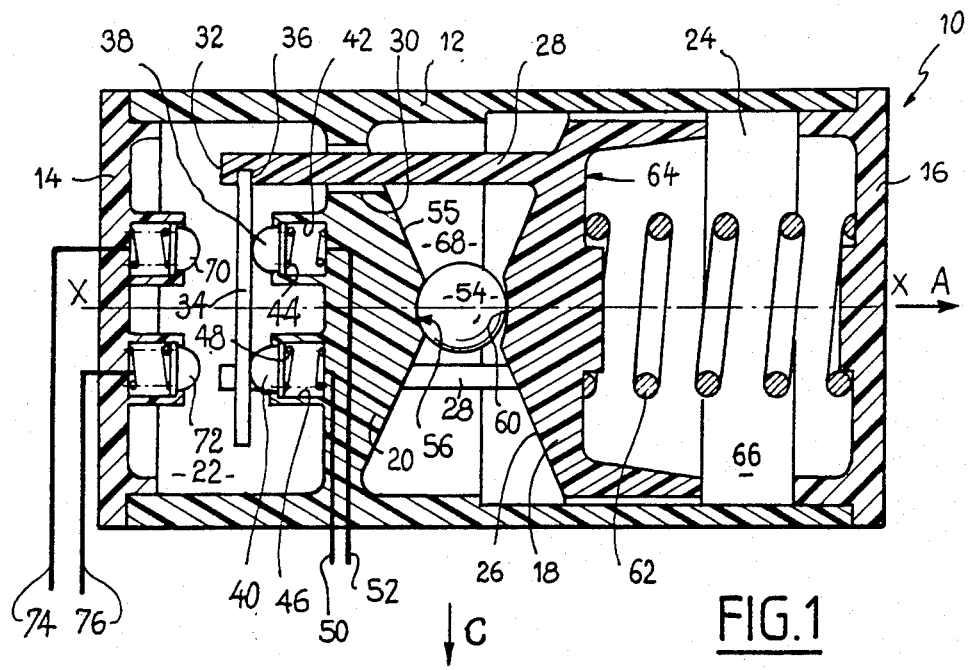
FIG. 1 is an axial sectional view of an inertia-actuated circuit breaker according to the invention, shown in its position of rest.
Figure 2:
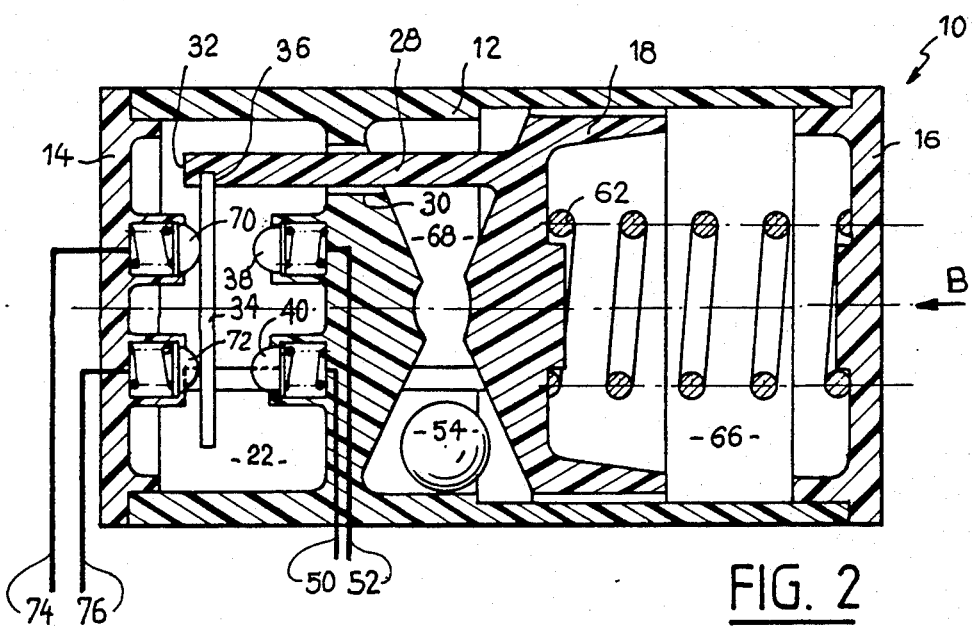
FIG. 2 is an axial sectional view of the circuit breaker of FIG. 1, shown in its circuit-breaking position.

The circuit breaker 10 shown in FIGS. 1 and 2 comprises a case 12 having a generally cylindrical shape and closed at its two opposite ends by plugs 14 and 16. The cylindrical case 12 and the plugs 14 and 16 may be made for example from a plastics material and secured to one another by ultrasonic welding.

A hollow piston 18 is slidably mounted inside the case 12. The piston 18 is slidable in a direction parallel to the axis X—X of the case 12 between a position of rest, shown in FIG. 1, and a circuit-breaking position shown in FIG. 2.

The cylindrical case 12 has an intermediate inner radial wall 20 which defines two chambers 22 and 24 inside the case 12. The piston 18 is slidably mounted inside the chamber 24 and has, on the front end 26 thereof facing toward the inner radial wall 20, three axial extensions 28 which extend through the radial wall 20 owing to the provision of three corresponding axial passage orifices 30. The free ends 32 of the axial extensions 28 of the piston 18 carry an electrically conductive element 34.

The conductive element 34 which, in the embodiment shown in the drawings is constituted by a metal disc, is fitted in three radial inner groove portions 36 formed in the vicinity of the free ends 32 of the axial extensions 28.

In the position of rest shown in FIG. 1, the conductive element 34 bears against two contact studs 38 and 40 of a first pair of electric contact studs.

According to the invention, each of the two contact studs 38, 40 is axially slidably mounted in the case 12. For this purpose, the contact stud 38 is slidably mounted in a blind bore 42 of the inner radial wall 20 of the case and is resiliently yieldably biased into bearing relation to the conductive element 34 by a metal compression spring 44 which is disposed inside the blind bore 42 and permanently biases the element 34 toward the left, as viewed in Fig.1. In the same way, the contact stud 40 is slidably mounted in a blind bore 46 and biased by a metal compression spring 48.

Through the metal springs 44 and 48, each of the two contact studs 38 and 40 is electrically connected to a wire 52, 50 respectively of an electric circuit which is desired to be broken in the event of impact.

The inertia-actuated element, which is responsive to the accelerations undergone by the circuit breaker in the event of impact, is a spherical ball 54.

In its position of rest, the ball 54 is maintained resiliently gripped between a fixed concave seat 56 provided on the side 55 of the inner radial wall 20 defining the chamber 24, and a movable concave seat 60 provided on the front side 26 of the slidable piston 18.

The ball 54 is resiliently gripped between the two seats 56 and 60 owing to the action of a calibration spring 62. The spring 62 is a compression spring which bears against the lateral right inner end 16 of the case 12 so as to resiliently bias the hollow piston 18 on the inner end 64 of which it bears.

The piston 18 divides the chamber 24 of the cylindrical case 12 into two chambers 66 and 68. The calibration spring 62 is disposed in the chamber 66 while, in the position of rest thereof, the ball 54 is maintained substantially at the centre of the chamber 68 of the case 12 defined by the inner radial wall 20 and by the piston 18.

As can be seen in FIG. 2, the ball 54 is capable of escaping radially into the chamber 68 to permit the piston 18 to occupy its circuit-breaking position under the action of the calibration spring 62, in which the electric circuit 50, 52 is broken. The confronting sides 55 and 26 of the inner radial wall 20 and the piston 18 have a conical profile and define a sufficient peripheral annular space for receiving the ball 54 in such manner that it does not hinder the movements of the piston 18.

The circuit breaker 12 further comprises a second pair of contact studs 70, 72 each of which is connected to a wire 74, 76 of a second electric circuit, for example a timing safety circuit. The contact studs 70 and 72 have a structure identical to that of the studs 38 and 40 so that they are axially slidable relative to the case 12.

As can be seen in FIGS. 1 and 2, the conductive element 34 electrically connects the studs 70 and 72 when the piston occupies the circuit-breaking position thereof, while the second electric circuit 74, 76 is broken when the piston is in the position of rest thereof.

Figure 3:
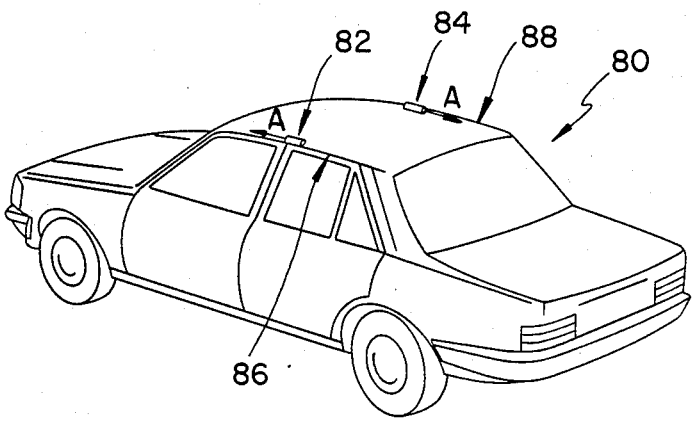
FIG. 3 is a perspective view of a motor vehicle equipped with two circuit breakers according to the invention.
Figure 4:
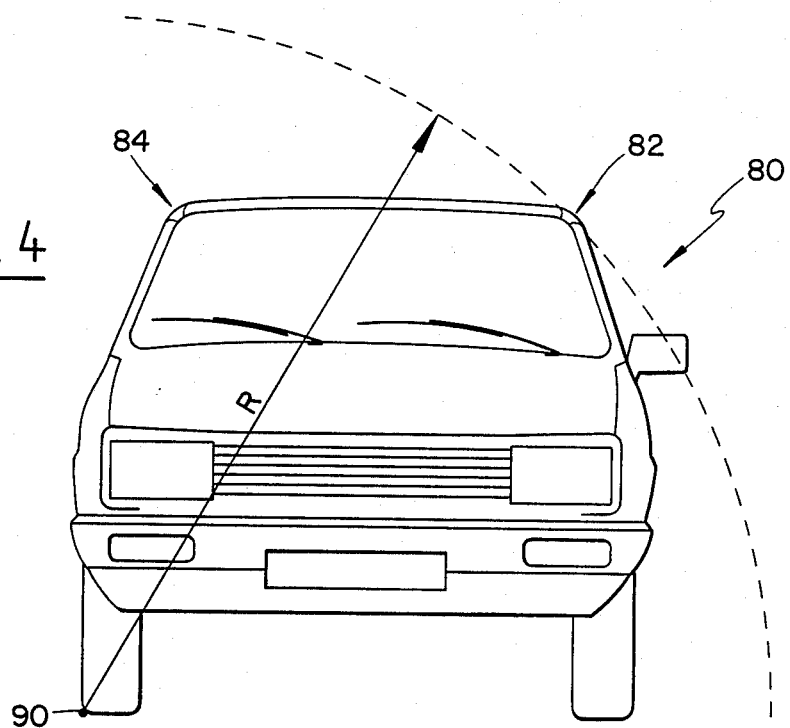
FIG. 4 is a front elevational view of the vehicle of FIG. 3.

FIGS. 3 and 4 show a motor vehicle 80 which is equipped with two inertia-actuated circuit breakers 82 and 84 arranged in accordance with the teaching of the invention.

The two circuit breakers 82 and 84 are disposed inside the vehicle in such manner that the axis of their respective case is parallel to the general axis of the vehicle and therefore parallel to the principal direction of movement of the latter.

The two circuit breakers are connected to the same electric circuit it is desired to break in the event of impact and are of course disposed in opposite directions in order to cause the breaking of the circuit both in the case of an impact from the front and in the case of an impact from the rear.

The circuit breakers are each disposed respectively in the vicinity of one of the two upper lateral edges 86 and 88 of the body of the vehicle 80 so as to increase the maximum radius R between the point of contact 90 of the wheels of the vehicle with the ground and the opposed circuit breaker, and consequently the sensitivity of the actuation of the circuit breaker should the vehicle overturn.

The circuit breaker according to the invention operates in the following manner:

In the event of an axially directed impact, i.e. if the ball 54 undergoes an acceleration in a direction parallel to the axis X—X of the cylindrical case 12, as indicated by arrow A in FIG. 1, the ball travels toward the right against the action of the force exerted by the calibration spring 62. This movement is possible owing to the resiliently yieldable slidable mounting of the contact studs 38 and 40 relative to the cylindrical case 12. The action of the ball 54 and the piston 18 on the spring 62 results in a relative separation of the seats 56 and 60 which enables the ball 54 to escape radially into the chamber 68.

When the ball 54 has left the seats 58 and 60, the piston 18 moves toward the left, as viewed in FIG. 2, in the direction shown by the arrow B, under the action of the calibration spring 62.

Upon this movement of the piston 18, the conductive element 34 moves away from the two contact studs 38, 40 and consequently breaks the electric circuit 50, 52. The piston 18 continues its travel until the element 34 comes to bear against the two contact studs 70 and 72 and establishes an electric connection within the second electric circuit 74, 76.

In the event of a lateral impact on the vehicle, or an overturning of the latter, only the ball 54 undergoes a radial acceleration from its position of rest in the direction indicated by arrow C in FIG. 1, which causes it to escape into the chamber 68 of the cylindrical case 12 and consequently a movement of the piston 18 which is similar to that described in the case of an axial acceleration of the ball 54.

I claim:

1. An inertia-actuated circuit breaker comprising a case defining an inner chamber having a longitudinal axis, a piston, an electrically conductive element fixed on the piston, an electric circuit having two contact studs carried by the case, the piston being axially slidably mounted in the case between a position of rest in which the conductive element bears against and interconnects the two contact studs and a circuit-breaking position in which said electric circuit is broken, a fixed concave seat carried by the case, a concave seat carried by the piston, a calibration spring bearing against and biasing the piston, and a ball which is maintained resiliently gripped, in said position of rest of the piston, by the calibration spring, between the fixed concave seat and the concave seat carried by the piston, the ball being maintained in position substantially at the centre of said chamber of the case into which chamber the ball radially escapes upon movement of the piston, to permit the piston to occupy said circuit-breaking position thereof, each of the contact studs being axially slidably mounted relative to the case to permit the piston to slide axially in opposition to the resiliently yieldable force exerted by the calibration spring, and resilient means for yieldably biasing the contact studs against the conductive element.

2. A circuit breaker according to claim 1, said resilient means comprising a blind bore for each of the contact studs in which bore the respective stud is slidably mounted, and a compression spring disposed in each blind bore for biasing the respective contact stud.

3. A circuit breaker according to claim 1, comprising an inner radial wall in the chamber of the case, the fixed seat being provided on a side of the inner radial wall of the case and the contact studs being arranged on an opposite side of said radial wall, and the piston including at least one axial extension which extends through said radial wall and has a free end adjacent to which end said conductive element is fixed.

4. A circuit breaker according to claim 1, further comprising a second pair of contact studs of another electric circuit, arranged in confronting relation to the two first-mentioned contact studs, and against which the conductive element bears when the piston occupies the circuit-breaking position thereof.

5. A circuit breaker according to claim 4, comprising two further blind bores in the case in which the contact studs of said second pair of contact studs are respectively slidably mounted, two compression springs being respectively disposed in said further blind bores for biasing the two contact studs of said second pair of contact studs.

6. A vehicle, and in particular a road motor vehicle, having at least one electric circuit which is desired to be broken in the event of impact, said vehicle being equipped with two inertia-actuated circuit breakers, one of which is oriented in a direction parallel to a principal direction of travel of the vehicle and one of which is oriented parallel to, but opposite to, the principal direction of travel of the vehicle, and are connected to said electric circuit of the vehicle, each inertia-actuated circuit breaker comprising a case defining an inner chamber having a longitudinal axis, a piston, an electrically conductive element fixed on the piston, said electric circuit having two contact studs carried by the case, the piston being axially slidably mounted in the case between a position of rest in which the conductive element bears against and interconnects the two contact studs and a circuit-breaking position in which said electric circuit is broken, a fixed concave seat carried by the case, a concave seat carried by the piston, a calibration spring bearing against and biasing the piston, and a ball which is maintained resiliently gripped, in said position of rest of the piston, by the calibration spring, between the fixed concave seat and the concave seat carried by the piston, the ball being maintained in position substantially at the centre of said chamber of the case into which chamber the ball radially escapes upon movement of the piston to permit the piston to occupy said circuit-breaking position thereof, each of the contact studs being axially slidably mounted relative to the case to permit the piston to slide axially in opposition to the resiliently yieldable force exerted by the calibration spring, and resilient means for yieldably biasing the contact studs against the conductive element.

7. A vehicle according to claim 6, comprising a body and wherein each of the two inertia-actuated circuit breakers is respectively disposed in the vicinity of one of two upper lateral edges of said body of the vehicle.

* * * * *